United States Patent [19]
Busch et al.

[11] 3,715,592
[45] Feb. 6, 1973

[54] THICKNESS CHANGE RADIATION GAUGE

[75] Inventors: Edward R. Busch, Clarks Summit; Guy B. Wood, Waverly, both of Pa.

[73] Assignee: Weston Instruments, Inc., Newark, N.J.

[22] Filed: Jan. 12, 1971

[21] Appl. No.: 105,886

[52] U.S. Cl. .......................................... 250/83.3 D
[51] Int. Cl. .................................................. G01t 1/16
[58] Field of Search .................................. 250/83.3 D

[56] References Cited

UNITED STATES PATENTS

| | | | |
|---|---|---|---|
| 3,190,261 | 6/1965 | Ziffer | 250/83.3 D X |
| 3,185,843 | 5/1965 | Hansen | 250/83.3 D |
| 3,244,206 | 4/1966 | Bossen | 250/83.3 D X |

Primary Examiner—James W. Lawrence
Assistant Examiner—Davis L. Willis
Attorney—William R. Sherman, Jerry M. Presson and John P. Sinnott

[57] ABSTRACT

An illustrative embodiment of the invention shows a technique for accurately observing relative changes in strip thickness during sheet metal rolling operations. This is accomplished by measuring the apparent attenuations of two collimated beams of radiation. The prime radiation beam and the scanning beam, for instance, are tilted in opposite directions relative to the plane of the longitudinally moving metal strip in order to provide clearance for the radiation sources and associated detectors during traverse across the strip width. These tilted beams enable the relative change in strip thickness to be measured at essentially the same longitudinal position.

8 Claims, 4 Drawing Figures

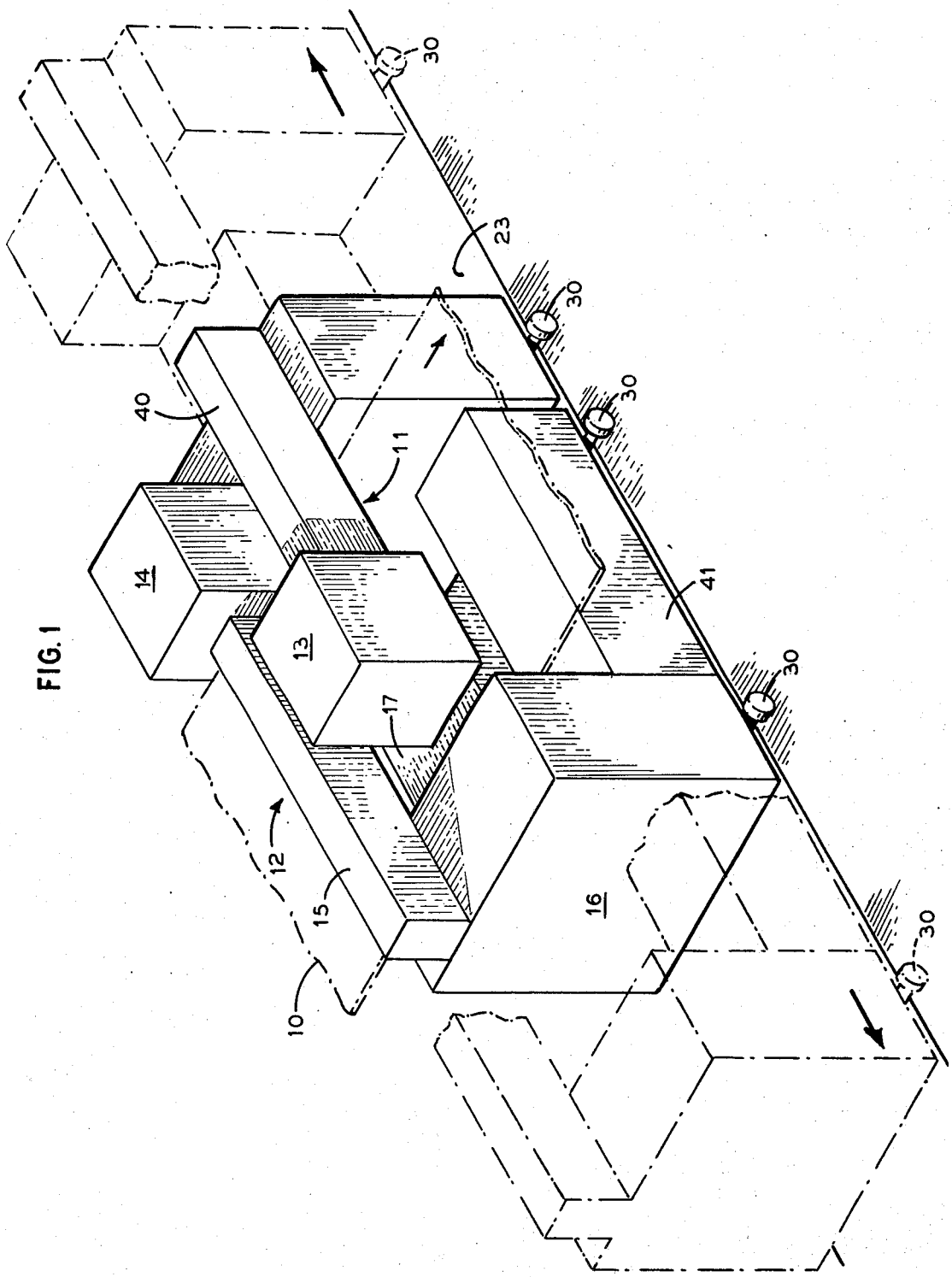

THICKNESS CHANGE RADIATION GAUGE

BACKGROUND OF THE INVENTION

1. Field of the Invention

This invention relates to radiation systems and more particularly, to techniques for X-ray gauging the relative thickness of metal strip, and the like.

2. Description of the Prior Art

The widespread industrial need to measure various physical characteristics, of which thickness, density and relative changes in these properties are typical, has been satisfied to some extent through applications of nuclear phenomena. Illustratively, neutrons, X-rays, gamma rays, and beta rays all have been used for these purposes.

For example, the partial absorption of a beam of parallel or collimated X-rays in a strip of metal as the strip emerges from a stand of mill rolls can be compared with similar absorptions in standard calibration strips to determine the thickness of the material under examination. The degree of absorption, observed through an X-ray detector disposed in alignment with the partly attenuated radiation beam is reflected in a signal that provides a thickness indication which can be used to assist in maintaining sheet or foil quality control. Steel, magnesium, copper and even aluminum sheet and foil production are often regulated in this way.

In order to observe relative variations in thickness, or departures from some predetermined thickness standard, two collimated sources of X-ray beams often are mounted on one side of, and perpendicular to the plane of the strip in question. On the opposite side of the strip, two radiation detectors, individual to and in general alignment with a respective one of the X-ray sources, each respond to incident radiation by producing a signal which is related to the intensity of the particular X-ray beam that penetrates the strip.

The X-rays are directed toward the detector in finely collimated beams, each having perhaps a cross section that is somewhat greater than the transverse area of the radiation sensitive portion of the associated detector. In order to produce a measurement that is more representative of the entire strip, and which might be on the order of 1 foot in width, a mechanism frequently is provided to shuttle one of the X-ray source and detector sets back and forth across the strip in a transverse direction which is generally perpendicular to the direction of strip movement. The other source and detector set is stationary and is used as a reference for comparison with the apparent X-ray absorption registered by the shuttling set.

Because the respective sets of X-ray source and detector equipment must necessarily occupy a finite volume, a longitudinal clearance is provided to enable these sets to shuttle past each other during transverse movement across the strip. This hitherto essential longitudinal clearance is a major cause of thickness gauge error. For example, during rolling, it has been found that changes in sheet or strip thickness in the direction in which the strip is moving through the roll stands, i.e., in the longitudinal direction, are three to four times greater than the thickness variations in width across the same portion of the strip. Consequently, the longitudinal offset or clearance required to allow the two sets to pass each other produces ambiguous detector signals in which an indicated relative change in strip thickness in the transverse direction is actually more likely to have been caused by a thickness change in the longitudinal direction.

Clearly, there is a need to overcome this inadequacy of the prior art. There is a need, moreover, to provide industry with gauging equipment that measures changes in physical properties at essentially the same longitudinal position.

SUMMARY OF THE INVENTION

These foregoing and other problems of the prior art are overcome by tilting the radiation beams relative to the plane of the advancing strip. Because a radiation detector ordinarily occupies a smaller volume than the associated radiation source or generator, less physical clearance is required for the detectors. For this reason, the radiation beams can be tilted toward each other in generally converging V-shaped relation when viewed from one side of the strip. In this manner, a significant width thickness error reduction is achieved by bringing the stationary primary beam and the shuttling beam longitudinally closer to each other. The V-shaped configuration thus enables the beams to penetrate essentially the same longitudinal part of the strip under investigation.

As an alternative, the tilted beams may cross each other in the plane of the strip or sheet. In this manner, an adequate longitudinal clearance is established for the respective sets of radiation sources or generators and the associated detectors, while the individual radiation beams are essentially in longitudinal alignment with respect to the transverse dimension or width of the strip.

More specifically, an illustrative embodiment of the principles of this invention is described in connection with an X-ray thickness gauge. Two X-ray generator and detector sets are supported on respective carriages or frames. The X-ray generator in the stationary or prime frame is tilted or offset about 24° from the vertical and is in alignment with the radiation sensitive portion of an associated detector. A similar generator-detector set in the scanning frame that traverses the strip width also uses an X-ray beam which is tilted or canted about 24° from the vertical in a direction opposite from the X-ray beam that is associated with the generator-detector set in the prime frame. This crossed beams configuration enables both beams to penetrate essentially the same transverse portion of the strip in question and almost fully eliminate the error that was inherent in prior art gauges because of the relative longitudinal displacement of the two X-ray beams. As the scanning frame shuttles into a nested relation with the prime frame, an adequate structural clearance is provided and the X-ray beams cross at the same longitudinal place in the plane of the strip passing between the generators and the respective detectors.

Preferably, a chain drive imparts the transverse shuttling motion to the scanning frame. Signals from the primary and scanning detectors, moreover, reflect the intensities of the respectively aligned X-ray beams which penetrate the strip. These signals are coupled to individual deviation amplifiers which generate signals indicative of the degree to which the respective portions of the strip vary in thickness from some predetermined standard. The deviation signals from the two amplifiers are coupled to a differential amplifier which measures the relative disparity in transverse thickness at the same longitudinal position. The differential amplifier signal may be recorded or, perhaps, used as a control signal to regulate mill operation with respect to sheet or strip thickness.

For the purpose of illustration, a specific embodiment of the invention has been shown in connection with an X-ray thickness gauge. The invention is, however, applicable to other nuclear phenomena of which neutrons and beta rays are typical. The invention, moreover, is not restricted to strip thickness measurements, but can be used to measure other physical parameters in diverse industrial environments.

BRIEF DESCRIPTION OF THE DRAWING

FIG. 1 is a perspective drawing of an assembled device in accordance with the invention showing the extreme positions of frame movement in solid and in broken lines, respectively;

DESCRIPTION OF THE PREFERRED EMBODIMENTS

For a more complete appreciation of the invention, FIG. 1 is a perspective view of a typical X-ray thickness gauge for observing relative thickness variations in a metal strip 10. The thickness measurements are observed with respect to the width or transverse dimension of the strip 10, which is a direction that is perpendicular to the longitudinal direction of strip movement, shown by the arrow, as the strip is processed through the rolling mill.

The thickness gauge structure comprises a prime frame 11 and a scanning frame 12. The scanning frame 12 shuttles back and forth from the extreme extended position shown in broken lines to the extreme nested position with the prime frame 11, as shown in solid lines. The shuttling motion enables the X-ray beam emitted from base 17 on the scanning frame to traverse the width of the strip 10 as the strip advances through the rolling mill. The track produced by the scanning frame 12 in the plane of the moving strip 10, moreover, is essentially diagonal.

Figure 2A:
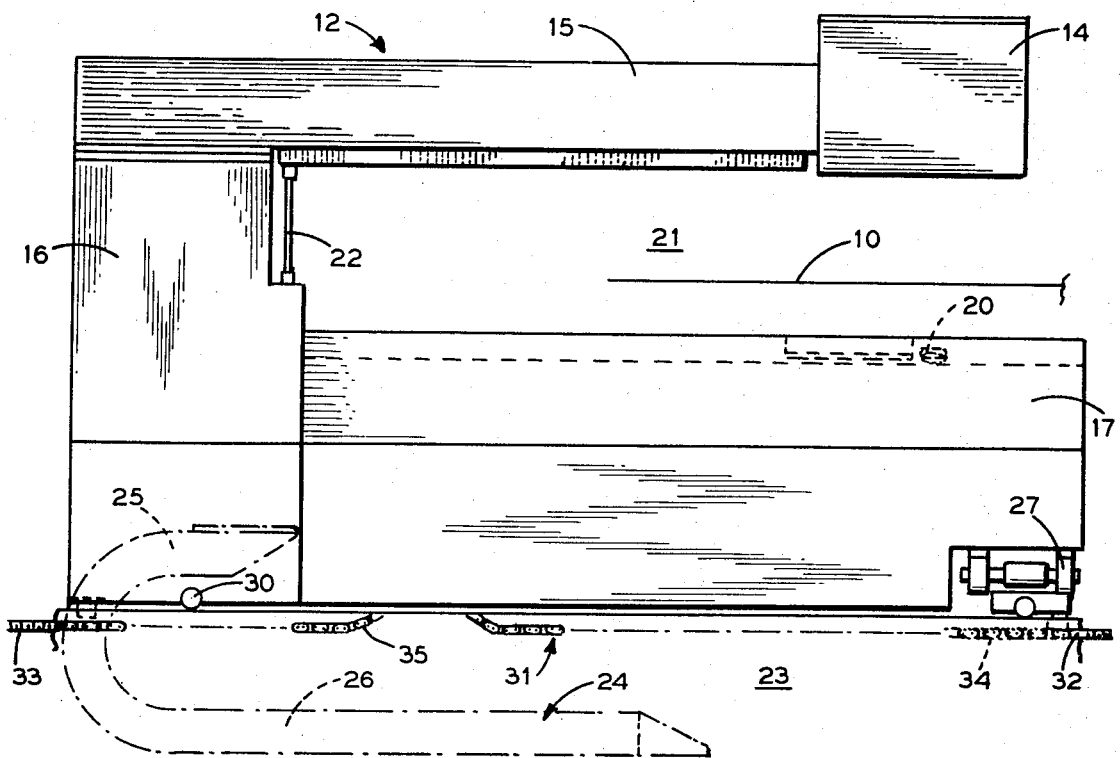
FIG. 2A is a side elevation of a typical frame for use in connection with the invention.

In FIG. 2A the scanning frame 12 comprises the head 14 which houses an X-ray detector (not shown). The head 14 is supported on the extreme end of a transverse cantilevered beam 15. The beam 15 is supported, on the end opposite to the head 14, by a vertically disposed upright member 16. As shown, the upright member 16 is connected to the transversely protruding frame base 17. Electrical equipment and the shuttling drive mechanism are housed in the base 17. X-ray generation equipment 20, which will be described subsequently in more complete detail, also is mounted in the base 17 and tilted about 24° with respect to the vertical in order to produce a beam of X-rays that is in general alignment with the detector in the head 14 during gauging operation.

The combination cantilevered beam 15, upright member 16, and scanning frame base 17, define a throat area 21. The throat area 21 is a bight that has sufficient transverse depth relative to the width of the strip 10 and the transverse dimensions of the immediately adjacent rolling mill structure (not shown) to enable the head 14 to traverse essentially the entire width of the strip 10. The strip 10, moreover, establishes an horizontal measurement plane for the system. The beam 15 and the associated upright member 16 also provide a support for the electrical conduits that are needed to supply power to the X-ray detector (not shown in FIG. 2A). The prime frame 11, however, has a throat area that is sufficient to place the respective X-ray generator and detector set over the longitudinal centerline of the strip 10.

Because the frames are exposed to intense heat from the strip that is being processed, the heat accumulated in the frame structure is dissipated through the circulation of a liquid coolant. Thus, as shown in FIG. 2A, coolant inlet and discharge conduits 22 also are supported on the member 16 and the beam 15.

The scanning frame 12 is mounted over a trench 23. The trench 23 provides clearance for the flexible cable carrier 24. Curved end 25 of the carrier 24 is secured to the lower portion of the upright member 16, while a horizontally disposed shank portion 26 extends below and in general alignment with the frame 12 in the trench 23. The cable carrier 24 provides a convenient structure for supporting all of the power, signal, and control conductors, as well as flexible coolant tubes (not shown). The carrier 24 thus enables the scanning frame 12 to shuttle back and forth over the trench 23 in a transverse direction without tangling or snarling the conductors and the tubes.

The scanning frame 12 is supported over the trench 23 and aligned with the strip 10 through roller assemblies 27 and 30 which engage the walls of the trench and the rolling mill floor immediately adjacent to the trench opening. The shuttling motion is imparted to the frame 12 through a sprocket and chain-drive 31. As shown in the drawing, anchor clevises 32 and 33 each are permanently secured in the trench masonry at respective opposite transverse ends of the trench 23. Roller chains 34 and 35, linked to the exposed ends of the clevises 32 and 33, respectively, are engaged by motor driven drive sprockets (not shown) within the frame 12. The drive sprockets respond to limit signals in order to take in and pay out the roller chains 34 and 35 according to the direction of the frame's motion to draw the frame 12 back-and-forth over the trench 23.

Figure 2B:
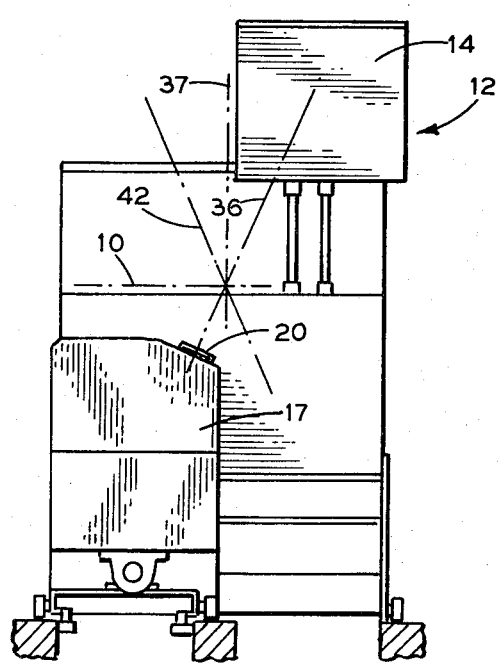
FIG. 2B is a front elevation of the frame shown in FIG. 2A.

FIG. 2B is a front elevation of the scanning frame 12 that illustrates some of the salient features of the invention. Illustratively, a beam of X-rays, diagrammatically shown at 36, is emitted from the scanning frame base 17. After penetrating the strip 10, those X-rays that are not absorbed in or scattered by the strip 10, are registered in the detector. In accordance with the invention, an X-ray beam 36 that is emitted from the base 17 is not perpendicular to the plane of the strip 10, but is tilted in order to form an angle of about 24° with a vertical reference 37.

The head 13 and cantilevered beam 40 on the prime frame 11 shown in FIG. 1 are longitudinally displaced relative to one side of the head 14 on the scanning frame 12. Prime frame base 41, moreover, is longitudinally displaced with respect to the scanning frame 12 to provide a clearance for the heads 13 and 14 and thereby to enable these heads to pass during the shuttling movement from the fully extended relation shown by the broken lines to the nested engagement illustrated by the solid lines in FIG. 1. An X-ray beam 42 (FIG. 2B) emitted from the prime frame base 41 also is canted or tilted through an angle of about 24°, relative to the vertical reference 37. Preferably, the prime frame 11 can be selectively positioned with respect to the width of the strip 10 as shown in solid lines in FIG. 1. During gauge operation, the prime frame 11 usually remains stationary on the mill center line as the scanning frame 12 shuttles back and forth.

Figure 3:
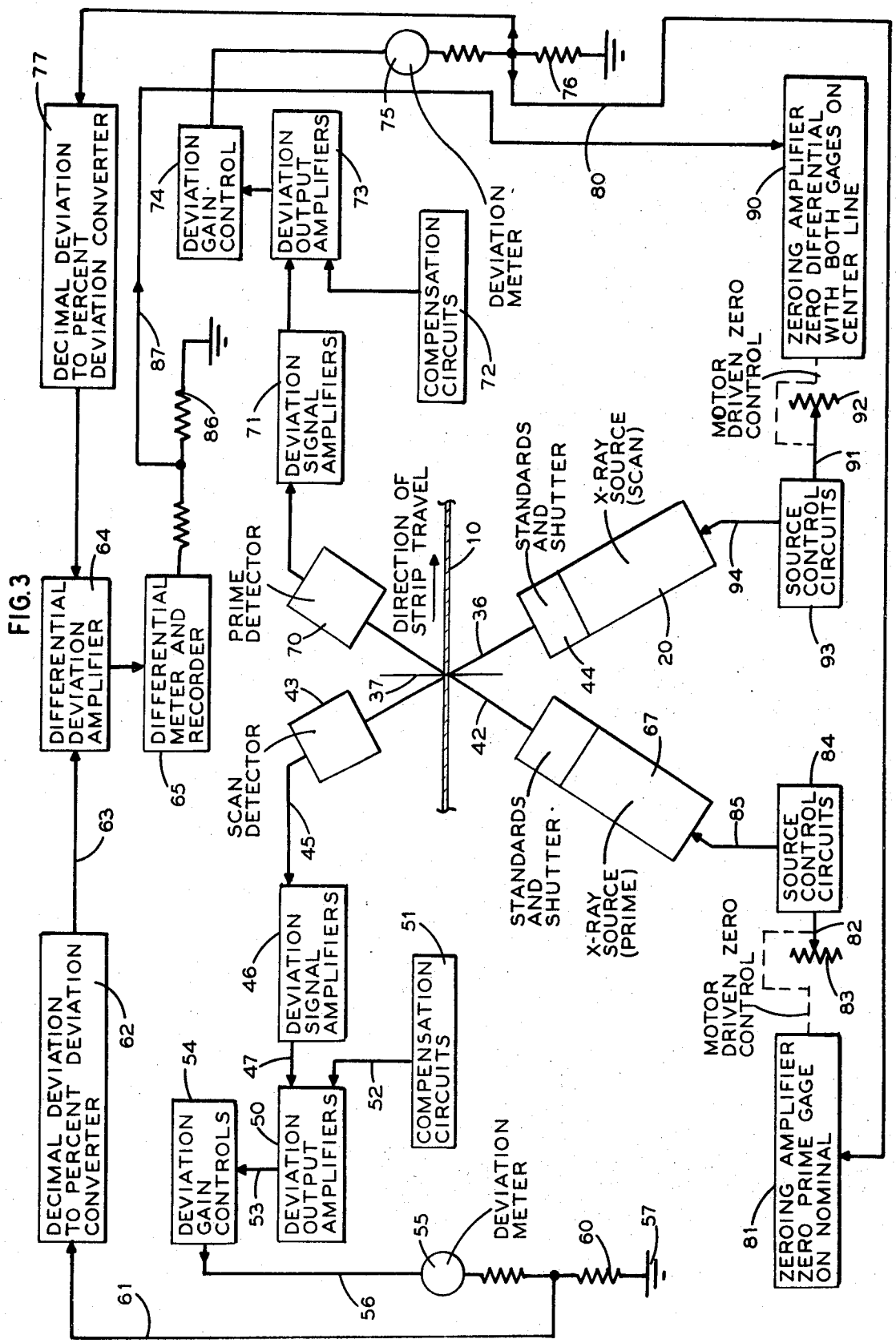
FIG. 3 is a block diagram of an illustrative circuit for use in connection with the invention.

An X-ray generator 20 (FIG. 3) mounted in the base 17 (FIG. 2A) of the scanning frame 12 is immersed in oil or some other suitable material in order to provide high voltage isolation. An apertured sheet of lead, moreover, also is interposed between the generator and the strip 10 to establish the collimated X-ray beam 36. As shown in FIG. 3, a shutter and a set of thickness standards 44 also are mounted within the base 17 in alignment with the X-ray beam 36. An X-ray detector 43 is disposed on the side of the strip 10 opposite from that of the X-ray generator 20 in order to register the attenuation of the X-ray beam 36 in the measuring plane established by the strip 10.

Preferably, the detector is a scintillation device that comprises a crystal or phosphor which is optically coupled to a photomultiplier tube. Ordinarily, X-rays produce brief flashes of light as a consequence of their interaction with the crystal structure. The photomultiplier responds to the radiation induced light quanta by producing an electrical charge pulse that generally is proportional to the intensity of each flash.

The X-ray detector 43, X-ray beam 36 and the X-ray generator 20 all are essentially in alignment, an alignment that is, moreover, established by tilting the X-ray generator about 24° from the vertical reference 37. Charge pulses reflecting the thickness of the strip 10 are sent from the detector 43 through a conductor 45 to a preamplifier or deviation signal amplifiers 46. The amplified deviation signal is coupled through a conductor 47 to a deviation signal output amplifier 50. Compensation circuits 51 also produce signals that are coupled to the deviation signal output amplifier 50 through a conductor 52 in order to compensate the output amplifier 50 for the presence of alloying elements, temperature effects, and the like.

The amplified and compensated signal from the amplifier 50 is sent through a conductor 53 to a deviation gain control circuit 54 in order to regulate the system amplification to produce signals that will not exceed meter and recorder scale limits.

A deviation meter 55 responds to the strength of the deviation signal from the gain control circuit 54 in conductor 56. The meter signal visually indicates the departure of the thickness of the strip 10 from the calibration standard 44. The meter 55 is coupled to ground 57 through a voltage divider 60. A conductor 61 connects the meter signal through a conversion circuit 62 and a conductor 63 to a differential deviation amplifier 64.

Typically, the converter circuit 62 changes the voltage divider 60 output from a radiation-related signal that reflects strip thickness as a decimal portion of an inch to signals that indicate percentage deviations from some nominal or standard thickness. These nominal deviation signals are processed in the differential amplifier 64. The differential amplifier 64 generates an output signal that reflects the contrast between the stationary frame X-ray beam 42 (FIG. 2B) and the scanning frame X-ray beam 36. In this manner, a meter and recorder 65 register relative differences in the thickness of the foil 10 at the same longitudinal position.

The thickness signal from the prime frame 11 (FIG. 1) is generated in essentially the same manner as the scanning frame signal. Thus, for instance, a prime frame X-ray source 67 as shown in FIG. 3 is mounted in the prime frame base 41 (FIG. 1) to direct the X-ray beam 42 through the strip 10 at an angle of 24° relative to the vertical reference 37. As shown in the drawing, the X-ray beam 42 is tilted in a direction that is opposite to the angle the X-ray beam 36 establishes with the vertical reference 37 in order to cross in the horizontal plane of the strip 10. It is preferable, although not essential, to establish the X-ray beams in planes that are parallel to the plane of the drawing as shown in FIG. 2B.

It is also within the terms of the invention to establish converging X-ray beams (not shown) which will essentially penetrate the same longitudinal portion of the strip. In this particular embodiment of the invention, two detectors, which occupy a smaller volume than the associated X-ray generators, are placed near adjacent sides of the respective frames in order to pass side to side during frame traverse. The X-ray beams approach convergence below the plane of the strip, but do not actually converge, in that they are aligned with respective detectors which nest together at the closest point of detector approach. The X-ray beams in this configuration describe either an upright or an inverted V-shape when viewed in a plane that is perpendicular to the strip 10 and parallel to the direction of strip travel. The X-ray generator and detector sets, moreover, need not be positioned on the same side of the strip 10. For example, the X-ray sources 20 and 67 can be oriented on opposite sides of the strip 10.

Depending on the physical character of the X-ray generators, detectors, and mill equipment, it is within the terms of this invention, moreover, to tilt the radiation beams not only as hereinbefore described, but also with respect to the plane of FIG. 2B. The purpose to be served by tilting the beams with respect to the vertical reference 37 is, of course, to reduce the longitudinal separation of the X-ray beams 36 and 42 in the plane of the strip 10. Hence, tilting the X-ray beams 36 and 42 through any plane angle or solid angle to achieve this result constitutes an important feature of the invention.

Turning once more to FIG. 3, a prime frame X-ray detector 70 is positioned to intercept the tilted X-ray beam 42. The detector 70 is of the same type and radiation sensitivity as the scanning frame detector 43. Signals from the prime frame detector 70 are processed through a circuit that is almost identical to the circuit described in connection with the scanning frame detector 43. Illustratively, the signals from the detector 70 are sent through a path that includes deviation signal amplifiers 71, compensation circuits 72, deviation output amplifier 73, deviation gain controls 74, deviation meter 75, voltage divider 76, conversion circuit 77 and the differential deviation amplifier 64.

As hereinbefore mentioned, the processed signal from the prime frame detector 70 is compared with the scanning frame detector signal in the differential amplifier 64. Departures from a null or zero differential deviation amplifier output indicate that the thickness of the strip 10 at the position under investigation by the scanning X-ray beam 36 is different from the strip thickness penetrated by the prime X-ray beam. In accordance with the invention, this relative thickness measurement is made at the same longitudinal position and on the transverse line that is defined by the intersection of the X-ray beams 36 and 42 with the plane of the strip 10. In this manner, relative thickness changes in the strip 10 at the position of the scanning frame 11 with respect to the strip thickness at the position of the prime frame 12 can be observed without introducing an error based on thickness variations in the longitudinal direction.

The illustrative signal processing circuit for the prime frame detector 70 differs from the scanning frame detector circuit in the following respect: a path 80 couples a signal from the voltage divider 76 to a zeroing amplifier 81. With a proper thickness standard in the prime gauge X-ray beam and the gage retracted from the strip, the zeroing amplifier regulates a motor driven zero control which drives an adjustable tap 82 on a potentiometer 83. The tap voltage regulates the output from the prime frame X-ray source 67 through source control circuits 84. These control circuits 84 apply proper accelerating voltage to the X-ray generator 67 through a conductor 85 to establish a correct X-ray beam intensity to null the deviation meter.

Turning once more to the differential signals, and in accordance with another feature of the invention, a voltage divider 86 couples a differential signal through a conductor 87 to a zeroing amplifier 90. With the prime gage zeroed for the nominal thickness to which the strip 10 is to be rolled (usually measured at the centerline), the scanning set also is brought to the same point on the strip. Then the zeroing amplifier 90 regulates another motor driven zero control which drives an adjustable tap 91 on a potentiometer 92. The tap voltage controls the accelerating voltage that is applied to the scanning frame X-ray source 20 through source control circuits 93. The source control circuit signals moreover, are applied to the X-ray generator 20 through a conductor 94 to establish a correct X-ray beam intensity and thereby to zero the differential output. Appropriate ground connections and power supplies (not shown) are coupled to all of the essential circuits in order to energize the thickness gauge.

In operation, the illustrative thickness gauge is positioned over the strip 10 (FIG. 1) to enable the prime frame 11 after zeroing to direct the X-ray beam 42 through the strip center line. Circuits associated with the scanning detector 43 and the prime detector 70 (FIG. 3) are energized to enable these detectors to respond to the interposition of the moving strip 10 through the mill and into the path of the X-ray beams 36 and 42.

Motor controls and other energizing circuits (not shown) are activated to cause the scanning frame 12 to shuttle transversely with respect to the direction of strip travel. The scanning frame 12 tracks back and forth across the width of the advancing strip 10 in order to produce a measurement of the variation and relative strip thickness as a function of strip width.

We claim:

1. A radiation gauge responsive to a parameter characteristic of a planar product longitudinally moving along a certain travel path, such as the thickness of a substantially flat sheet of material, comprising first and second gauging units, each said gauging unit including a radiation source for producing a beam of radiation having an axis intersecting the travel path of the product and a radiation detector in alignment with the axis of the radiation beam; means on said units for supporting said sources and detectors so that the axis of each beam is inclined at an acute angle with respect to the plane of the product; and means for moving said first unit for transversely scanning the longitudinally moving product with the beam produced by the radiation source carried by said first unit, the path of travel of said beam produced by said first unit intersecting said longitudinally moving product, said path of travel having a common zone of irradiation with the beam produced by said second unit in the plane of said product.

2. A radiation gauge according to claim 1 wherein said radiation detectors produce respective output signals related to the radiations detected after interaction of the respective beams of radiation with the product, and said units further include circuit means coupled to the outputs of said detectors for comparing the respective detected radiations.

3. A gauge according to claim 2 and including means responsive to said comparing means for calibrating one of said gauging units to obtain a reference at the output of said comparing means when said radiation beams intersect the path of the moving product at said zone.

4. A gauge according to claim 1 wherein the axes of the radiation beams of said units are symmetrically inclined with respect to a plane substantially perpendicular to the direction of travel of the moving product.

5. A gauge according to claim 4 wherein the axes of the radiation beams of said units are inclined by about 24° on said substantially perpendicular plane.

6. A gauge according to claim 1 wherein the radiation beam of said second unit is directed to intersect said scanning beam within a transverse cross sectional area of said product.

7. A gauge according to claim 1 wherein each of said units includes a substantially forkshaped frame having one arm supporting the radiation source on one side of the travel path of the moving product and another arm supporting the radiation detector on an opposite side of the travel path of the moving product and a member connecting these arms on a lateral side of the travel path of the moving product.

8. A gauge according to claim 7 wherein the space separating the arms of one of said frames intersects the space separating the arms of the other of said frames as the frame of said movable first unit is brought into a nested relationship with respect to the frame of the second unit.

* * * * *